United States Patent
Bauer et al.

(10) Patent No.: US 7,105,111 B2
(45) Date of Patent: Sep. 12, 2006

(54) PROCESS FOR PRODUCING HOLLOW BODIES COMPRISING FIBRE-REINFORCED CERAMIC MATERIALS

(75) Inventors: Moritz Bauer, Augsburg (DE); Michael Heine, Allmannshofen (DE); Udo Gruber, Neusaess (DE); Ronald Huener, Baar (DE); Andreas Kienzle, Thierhaupten (DE); Andreas Rahn, Wertingen (DE); Rainer Zimmermann-Chopin, Ellgau (DE)

(73) Assignee: SGL Carbon AG, (DE)

( * ) Notice: Subject to any disclaimer, the term of this patent is extended or adjusted under 35 U.S.C. 154(b) by 489 days.

(21) Appl. No.: 10/256,492

(22) Filed: Sep. 26, 2002

(65) Prior Publication Data

US 2006/0071373 A1    Apr. 6, 2006

(30) Foreign Application Priority Data

Oct. 2, 2001    (DE) ............................... 101 48 659

(51) Int. Cl.
*C01B 31/00* (2006.01)

(52) U.S. Cl. .................. 264/29.7; 264/317; 264/610

(58) Field of Classification Search ............... 264/29.7, 264/317, 610
See application file for complete search history.

(56) References Cited

U.S. PATENT DOCUMENTS

| | | | |
|---|---|---|---|
| 3,867,491 | A | 2/1975 | Marin |
| 4,847,063 | A | 7/1989 | Smith |
| 6,086,814 | A | 7/2000 | Krenkel et al. |
| 6,261,981 | B1 | 7/2001 | Dietrich et al. |
| 6,328,834 | B1 | 12/2001 | Rebstock et al. |

FOREIGN PATENT DOCUMENTS

| | | |
|---|---|---|
| DE | 197 10 105 A1 | 9/1998 |
| DE | 197 11 829 C1 | 9/1998 |
| DE | 198 24 571 A1 | 12/1999 |
| DE | 198 56 721 A1 | 6/2000 |
| DE | 198 34 571 | 7/2001 |
| EP | 0 788 468 | 8/1997 |
| EP | 1 008 569 | 6/2000 |
| WO | WO-96/13470 | 5/1996 |
| WO | WO 96/13470 A1 | 5/1996 |
| WO | WO-98/42635 | 10/1998 |

*Primary Examiner*—Dionne W. Mayes
(74) *Attorney, Agent, or Firm*—Connolly Bove Lodge & Hutz LLP

(57) ABSTRACT

Process for producing hollow bodies comprising fibre-reinforced ceramic materials, where cores whose shape corresponds to that of the hollow spaces are produced in a first step, a green body is produced in a second step by introducing the abovementioned cores and a press moulding compound into a mould, where the press moulding compound comprises carbon fibres and/or carbon threads and pitch and/or resins, the green body is cured in a third step by heating under pressure, and then carbonised in a fourth step by heating in the absence of oxidants to form a C/C body, which latter can be infiltrated with liquid metal with retention of its shape in a fifth step, with at least partial formation of carbides, where the cores comprise a material which is non-meltable but undergoes at least sufficient shrinkage above the curing temperature of the shaping by pressing of the press moulding compound for the shrunken core to be able to be taken out from the carbonised body; hollow bodies produced by this process and also their use as brake disks, clutch disks and friction disks

14 Claims, No Drawings

PROCESS FOR PRODUCING HOLLOW BODIES COMPRISING FIBRE-REINFORCED CERAMIC MATERIALS

FIELD OF THE INVENTION

The present invention relates to a process for producing hollow bodies comprising fibre-reinforced ceramic materials.

BACKGROUND OF THE INVENTION

In particular, the invention relates to a process for producing a porous fibre-reinforced carbon-containing shaped body which has recesses or hollow spaces and is close to the final shape, in particular a fibre-reinforced C/C body ("CFC" or "CFRC"=carbon fibre reinforced carbon) which is shaped from binder-containing fibre compositions by means of a pressing procedure using pressing cores and is converted into C/C in a subsequent thermal treatment, and also, if appropriate, to the densification of a porous fibre-reinforced carbon-containing shaped body to form a carbon-containing ceramic matrix, in particular by infiltration of the C/C body with liquid metal, so that the matrix then comprises metals and metal carbides, possibly together with residual unreacted carbon.

The term "metal" also includes silicon, for the purposes of this invention.

SUMMARY OF THE INVENTION

The process of the invention relates particularly to the production of ceramic composite materials which are reinforced with carbon fibres and have recesses and hollow spaces and which are converted by infiltration with silicon melts including reaction with at least part of the carbon to form silicon carbide (SiC), to composite materials which are reinforced with carbon fibres and have a SiC-containing or carbon- and SiC-containing matrix (C/SiC or C/C—SiC materials). These composite materials are employed, in particular, in brake disks, clutch disks and friction disks and also as construction materials which are resistant to high temperatures.

DETAILED DESCRIPTION OF THE PREFERRED EMBODIMENTS

Materials used for automotive brake disks are nowadays predominantly steel or gray cast iron, and in aircraft applications, carbon materials reinforced with carbon fibres (C/C). The properties required of the disk materials are high mechanical stability, heat resistance, hardness and wear resistance in combination with the friction partner in the friction pairing of the brake. The work temperature of gray cast iron brake disks used hitherto is limited by the melting point of the material. The temperature at which mechanical failure occurs is, depending on the stress, significantly below the melting point. Furthermore, there is a risk of cracking of the disks due to transformation of the metallic microstructure on heating. The use of fibre-reinforced ceramic as a material for brake disk applications has been found to be a solution to these problems. Materials based on silicon carbide reinforced with carbon fibres (C/SiC) in particular have been found to be useful for this application. The advantages of this material are its lower density (thus reduced weight for a given volume), its high hardness and heat resistance up to about 1400° C. and, not least, its extremely high wear resistance. The significantly reduced weight of brake disks made of these C/SiC materials is a positive factor in improving comfort and safety by reduction of the unsprung masses in motor vehicles and an economic factor in the aircraft field. The high hardness and wear resistance of C/SiC components makes it possible to achieve far longer operating lives compared to previously customary materials based on C/C or metal.

A process for producing C/SiC components is known from, for example, DE-A 197 10 105 and comprises, inter alia, the following steps:

preparation of a press moulding compound of carbon-containing fibres or fibre bundles which may be coated with a coating and fillers and/or binders such as resins and/or pitch, shaping of the mixture under pressure and at elevated temperature and carbonisation of the carbon-containing fillers and binders to produce a shaped body, in particular a shaped body comprising carbon reinforced with carbon fibres (C/C) and, if appropriate, graphitisation, infiltration of at least an outer layer of the shaped body with a silicon melt and at least partial reaction of the carbon in the shaped body to produce SiC, thus forming a shaped body which comprises, at least in the outer layer, a composite ceramic composed of carbon-containing fibres embedded in a matrix comprising predominantly SiC, Si and C (here referred to as C/SiC).

In the following, the term C/SiC also encompasses the material variant in which, as described above, only an outer layer is siliconised.

Customary production processes also include those where the C/C body is densified via the liquid or gas phase with carbon precursors, namely substances which form carbon upon heating in the absence of oxidising media, or by means of carbon, or the matrix comprising predominantly SiC, Si and C is produced by gas-phase infiltration (CVD, chemical vapour deposition, or CVI, chemical vapour infiltration) or by pyrolysis of Si-containing pre-ceramic polymers.

Present-day metallic brake disks frequently have ventilation slits or channels through which air flows within the disk so as to reduce the temperature of the disk and decrease wear of the friction lining under high load. Such ventilation channels are also employed in brake disks based on C/SiC, particularly to lower the temperature so as to spare the brake linings and further components of the system.

One process for producing friction units of C/C—SiC material having ventilation channels, hollow spaces and recesses in which a structured porous carbon body close to the final shape is infiltrated with liquid silicon is known from EP-B 0 788 468. This process makes use of the fact that the liquid silicon infiltration and formation of the Si- and SiC-rich composite matrix occurs virtually without changes to the geometry of the C/C intermediate body, so that the hollow spaces and recesses can be produced in the relatively soft and readily machinable C/C intermediate body and not only in the very hard C/C—SiC composite ceramic. It is suggested, inter alia, to form the hollow spaces and recesses by means of soluble cores comprising polystyrene foam, e.g. ®Styropor, or other rigid foams, by means of pyrolysable cores comprising polyvinyl alcohol or by means of removable cores comprising rubber, metal or ceramic.

The polymers proposed there as core material are found to be too soft and thermally unstable for the press moulding process with thermal curing. Treatment with solvents to remove the cores involves the risk of destroying the generally still very soft intermediate body. This risk is likewise present in the pyrolysis variant if polyvinyl alcohol is used as the polymer, as suggested, which upon heating forms gaseous decomposition products within the preform; these gaseous products are given off copiously and can break the shaped body. Customary metals and ceramics are also unsuitable for the thermal processes for curing the pressed green body and its carbonisation to form the C/C intermediate body owing to their generally unmatched thermophysical properties.

In DE-C 198 24 571, a further process is described for producing hollow spaces in an object comprising C/SiC composite ceramics. The hollow spaces are formed in the manufacture of the preform by press moulding using cores of silicon, silicon alloys or Si/BN mixtures. The cores are not removed from the preform until the step of infiltration with liquid silicon, and serve as a source of silicon for the siliconisation. Before the siliconisation, the preform has to be heated and converted into a C/C intermediate body, with decomposition of the organic constituents, for example binders, and shrinkage of the preform. This shrinkage leads to the preform shrinking onto the silicon-containing cores which in turn additionally undergo a thermal expansion due to heating. In general, undesirable stress is generated, and even fracture occurs in the preform as a result, both of which have to be avoided.

It is therefore an object of the invention to provide a core material and to develop a process matched thereto which is suitable for shaping the fibre-reinforced carbon-containing intermediate bodies by pressing so that they have a shape close to the final shape, with the core being able to be removed gently, simply and preferably without leaving a residue and without damaging the cured intermediate body.

According to the invention, this object is achieved by using cores made of non-melting materials which, during the further thermal process, undergo a shrinkage compared to the intermediate body (corresponding to the hollow body formed later) which can result from, in particular, a carbonisation step, so that they can easily be removed from the intermediate body. The intermediate bodies which have been freed of the core can then, if appropriate, be subjected to infiltration with molten metal, in particular siliconisation, to give the finished composite ceramic.

The invention accordingly provides a process for producing hollow bodies comprising fibre-reinforced ceramic materials, where cores whose shape corresponds to that of the hollow spaces are produced in a first step, a green body is produced in a second step by introducing the abovementioned cores and a press moulding compound into a mould, where the press moulding compound comprises carbon fibres and/or carbon fibre bundles and/or carbon threads, which have preferably been coated with carbon or carbon-containing compounds, and pitch and/or resins which form carbon-containing residues on heat treatment in the absence of oxidants, in such a way that the position of the cores corresponds to the desired position of the hollow spaces to be formed, the green body is cured by heating to a temperature of from 120° C. to 280° C. under pressure in a third step, the cured green body, also referred to as intermediate body, is carbonised in a fourth step by heating in the absence of air and other oxidants to a temperature of from about 750° C. to about 1100° C. to give a C/C body, and, if desired, the C/C body is infiltrated with liquid metal with retention of its shape in a fifth step, with at least partial reaction of the carbon present in the matrix of the C/C body with the metal to form carbides, wherein the cores comprise a material which is non-meltable but undergoes at least sufficient shrinkage above the curing temperature of the shaping by pressing of the press moulding compound for the shrunken core to be able to be taken out of the carbonised body. The shrinkage preferably sets in at temperatures at least 20° C. above the temperature at which the green body is shaped (third step) and is usually at least 10% of the original core volume, preferably at least 20% and particularly preferably at least 30%. The remainder of the cores after shrinkage is preferably at least 15% of the original mass.

The linear coefficient of thermal expansion of the material used for the cores up to its decomposition temperature is preferably not more than $1 \cdot 10^{-5}$ $K^{-1}$.

In general, suitable shaping processes for shaping the cores are the known methods such as cold or hot pressing, injection moulding or cutting machining, depending on the material used.

The process of the present invention provides for press moulding compounds comprising fibres, thermally curable binders and, in particular, carbon-containing additives to be pressed in the second step to form green bodies having hollow spaces and/or recesses.

The carbon fibre layers of the C/C intermediate body are preferably built up in the vicinity of the core in a predetermined preferential direction of the carbon reinforcing fibres on the core. For this purpose, preference is given to using press moulding compounds which comprise carbon fibres having a mean length of at least 5 mm. The press moulding compound of the second step is then preferably introduced into the mould in such a way that the carbon fibres in the vicinity of the core are predominantly oriented parallel to the direction of the highest tensile stress in the resulting shaped part. In this context, predominantly means at least 50%. It is also possible to wind tapes made of parallel and bound carbon fibres (also known as "UDTs"=unidirectional tapes) around the cores, and to fix this sheath by means of thermally curable binders if necessary. Further press moulding compounds containing short fibres or fibre bundles are then usually applied on top of this layer of carbon fibres or threads oriented in the preferred direction.

In another preferred embodiment, carbon fibres are used in the form of coated short fibre bundles. Particular preference is here given to fibres or fibre bundles which are coated with graphitised carbon and have mean lengths of less than 5 mm.

As thermally curable binders, use is made of pitches such as coal tar pitch or petroleum pitch and/or preferably curable resins such as phenolic resins, epoxy resins, polyimides, filler-containing mixtures with furfuryl alcohol or furan resins. The compositions are, for this purpose, introduced into a pressing mould which is provided with "lost cores". The cores occupy the space of the hollow spaces or recesses to be formed later in the composite ceramic. After the pressing mould has been filled, the composition is pressed and cured under the action of heat.

According to the invention, nonmeltable but possibly carbonisable materials are used for the cores. These materials decompose at least partially during the thermal treatment up to and during the carbonisation of the green body so that they undergo a volume shrinkage. A critical factor here is that the cores experience a considerable volume shrinkage of at least 10% of their initial volume, but at least a greater volume shrinkage than the green body, during the decomposition, so that the core material becomes detached from the green body. This prevents that the formation of gaseous decomposition products (pyrolysis gases) leads to damage of the green body or the C/C body.

The cores consist of a non-meltable material which generally has a high heat distortion temperature, usually at least 200° C., preferably at least 230° C. and in particular at least 250° C. This makes higher curing temperatures for the green body during shaping possible, as a result of which, inter alia, the curing process is advantageously accelerated. However, the nonmeltable cores are frequently decomposed completely or virtually completely during the carbonisation of the green body; in the case of incomplete decomposition, they are carbonised, i.e. only carbon residues remain. Preference is given to materials which are carbonised not to give powders but rather to give relatively large fragments, since the latter are easier to remove from the green body without the pores of the C/C body becoming blocked or conglutinated. Such materials include, in particular, wood and synthetic wood. To minimise the effort required to remove the carbon residues, the most complete pyrolysis possible would be desirable. This would, however, mean that a great deal of pyrolysis gas is formed, which is associated with the abovementioned disadvantages. For this reason, the cores are preferably produced from carbonisable materials which at pyrolysis temperatures of about 900° C. leave a carbon residue or pyrolysis residue which amounts to at least 10%, preferably at least 25% and particularly preferably at least 30% of the mass of the core used. Materials suitable for carbonisable cores are wood, composite wood, synthetic wood moulding compositions and thermosets. Preference is given to composite wood bound with urea or melamine resins and synthetic wood.

The cores can also be made of fibre-reinforced and/or filled materials in which the matrix is non-meltable but is completely or at least partially thermally degradable and in which the fillers remain after thermal degradation. Such fillers are the known inert fillers comprising ceramic materials, mineral materials, glass and metals, e.g. chalk, glass spheres, glass microspheres, mineral fibres such as wollastonite, glass fibres, carbon fibres, and ceramic fibres such as silicon nitride or carbide fibres.

After carbonisation of the green body, any pyrolysis residues or carbon residues or residues of the fillers present in the hollow spaces formed are removed for example blown out using an air current, and a porous C/C body having hollow spaces or recesses is obtained and can be utilised further. It can be subjected to further machining/shaping or assembled or adhesively bonded to produce more complex structures.

In a fifth step, the porous C/C body is, if desired, densified to enhance its usefulness.

In a preferred embodiment of the process of the invention, the carbon of the C/C body is converted at least partly into the corresponding carbides by infiltration with molten metals and, if appropriate, subsequent heat treatment. Preference is given to infiltration with molten silicon, in which case at least part of the carbon (preferably the carbon in the matrix) reacts to form silicon carbide; the matrix then comprises SiC, unreacted carbon and unreacted silicon. For this purpose, the C/C body is covered with silicon powder and then heated under reduced pressure to temperatures of from about 1500 to about 1800° C. Depending on the intended use, it is not absolutely necessary to convert all of the C/C body into C/SiC, but it is usual for at least the outer layer to be converted into C/SiC. Although liquid silicon infiltration is the preferred process, the C/C body can also be densified by means of other customary processes to form the matrices customary in composite materials technology. In particular, the liquid silicon infiltration process can also be carried out using silicon alloys which may further comprise, inter alia, metals such as Cr, Fe, Co, Ni, Ti and/or Mo.

The process described is preferably used for producing brake disks or clutch disks. Here, the press moulding compound and the cores are introduced into a cylindrical mould, with continuous layers of the press moulding compound preferably being introduced as lowermost and uppermost layers. The thickness of the bottom layer and the covering layer after pressing is preferably at least 7 mm. The shaped body which forms the brake or clutch disk usually has an annular outer shape, i.e. the region near the axis is open over the entire thickness of the disk. The cores are preferably arranged in a rotation-symmetric manner around the axis of the cylinder, and preference is given to using at least 2 and not more than 16 cores. The shape of the cores is preferably such that the hollow spaces formed extend from the periphery of the annular shaped body to the internal edge of the shaped body and thus form an open passage between the internal and external cylindrical edges of the annulus.

The invention claimed is:

1. A process for the production of ceramic composite materials which are reinforced with carbon fibres and have recesses and hollow spaces, where
    cores whose shape corresponds to that of the hollow spaces are produced in a first step,
    a green body is produced in a second step by introducing the abovementioned cores and a press moulding compound into a mould, where the press moulding compound comprises carbon fibres and/or carbon threads and pitch and/or resins which form carbon-containing residues on heat treatment in the absence of oxidants, in such a way that the position of the cores corresponds to the desired position of the hollow spaces to be formed,
    the green body is cured by heating to a temperature of from 120° C. to 280° C. under pressure in a third step,
    the cured green body, also referred to as intermediate body, is carbonised in a fourth step by heating in the absence of air and other oxidants to a temperature of from about 750° C. to about 1100° C. to give a C/C body.
        wherein the cores are made of a material which has a heat distortion temperature of at least 200° C. and is non-meltable but undergoes at least a shrinkage of 10% of the original core volume above the curing temperature of the press moulding compound sufficient for the shrunken core to be able to be taken out from the carbonised body, and
    wherein the press moulding compound of the second step comprises carbon fibres in the form of coated short fibre bundles as reinforcing material.

2. The process as claimed in claim 1 wherein, subsequent to the fourth step,
    the C/C body is infiltrated with liquid metal with retention of its shape in a fifth step, with at least partial reaction of the carbon present in the matrix of the C/C body with the metal to form carbides.

3. The process as claimed in claim 1, wherein the shrinkage is at least 20% of the original core volume.

4. The process as claimed in claim 1, wherein the shrinkage commences at temperatures of at least 20° C. above the temperature at which the green body is shaped in the third step.

5. The process as claimed in claim 1, wherein carbon fibres have a mean length of at least 5 mm.

6. The process as claimed in claim 5, wherein the press moulding compound of the second step is introduced into the mould in such a way that the carbon fibres are predominantly oriented parallel to the direction of the highest tensile stress in the resulting shaped part.

7. The process as claimed in claim 1, wherein the material of the cores has a linear coefficient of thermal expansion up to its decomposition temperature of not more than $1 \times 10^{-5} K^{-1}$.

8. The process as claimed in claim 1 wherein the material of the cores leaves a carbon residue or pyrolysis residue at pyrolysis temperatures of about 900° C. which amounts to at least 25% of the mass of the core used.

9. The process as claimed in claim 1 wherein the material of the cores is selected from the group consisting of wood, composite wood, synthetic wood moulding compositions and thermosets.

10. The process as claimed in claim 1 wherein the material of the cores comprises fillers.

11. The process as claimed in claim 10, wherein the fillers are selected from the group consisting of ceramic materials, mineral materials, metals, glass and thermosets.

12. The process as claimed in claim 10, wherein the fillers are selected from the group consisting of chalk, glass spheres, glass microspheres, wollastonite, glass fibres, carbon fibres and ceramic fibres.

13. A process for the production of ceramic composite materials which are reinforced with carbon fibres and have recesses and hollow spaces, where cores whose shape corresponds to that of the hollow spaces are produced in a first step, a green body is produced in a second step by introducing the abovementioned cores and a press moulding compound into a mould, where the press moulding compound comprises carbon fibres and/or carbon threads and pitch and/or resins which form carbon-containing residues on heat treatment in the absence of oxidants, in such a way that the position of the cores corresponds to the desired position of the hollow spaces to be formed, the green body is cured by heating to a temperature of from 120° C. to 280° C. under pressure in a third step, the cured green body, also referred to as intermediate body, is carbonised in a fourth step by heating in the absence of air and other oxidants to a temperature of from about 750° C. to about 1100° C. to give a C/C body, wherein the cores are made of a material which has a heat distortion temperature of at least 200° C. and is non-meltable but undergoes at least a shrinkage of 10% of the original core volume above the curing temperature of the press moulding compound sufficient for the shrunken core to be able to be taken out from the carbonised body, and wherein the material of the press moulding compounds comprises pitches selected from the group consisting of coal tar pitch and petroleum pitch.

14. A process for the production of ceramic composite materials which are reinforced with carbon fibres and have recesses and hollow spaces, where cores whose shape corresponds to that of the hollow spaces are produced in a first step, a green body is produced in a second step by introducing the abovementioned cores and a press moulding compound into a mould, where the press moulding compound comprises carbon fibres and/or carbon threads and pitch and/or resins which form carbon-containing residues on heat treatment in the absence of oxidants, in such a way that the position of the cores corresponds to the desired position of the hollow spaces to be formed, the green body is cured by heating to a temperature of from 120° C. to 280° C. under pressure in a third step, the cured green body, also referred to as intermediate body, is carbonised in a fourth step by heating in the absence of air and other oxidants to a temperature of from about 750° C. to about 1100° C. to give a C/C body, wherein the cores are made of a material which has a heat distortion temperature of at least 200° C. and is non-meltable but undergoes at least a shrinkage of 10% of the original core volume above the curing temperature of the press moulding compound sufficient for the shrunken core to be able to be taken out from the carbonised body, and wherein the material of the press moulding compounds comprises resins selected from among phenolic resins, epoxy resins, polyimides, filler-containing mixtures with furfuryl alcohol and furan resins.

* * * * *

UNITED STATES PATENT AND TRADEMARK OFFICE
CERTIFICATE OF CORRECTION

| | |
|---|---|
| PATENT NO. | : 7,105,111 B2 |
| APPLICATION NO. | : 10/256492 |
| DATED | : September 12, 2006 |
| INVENTOR(S) | : Moritz Bauer et al. |

It is certified that error appears in the above-identified patent and that said Letters Patent is hereby corrected as shown below:

In the Claims:

Column 6, line 45, "body." should read -- body, --

Column 6, line 56, "2. The process as claimed in claim 1 wherein, subsequent" should read -- 2. The process as claimed in claim 1, wherein, subsequent --

Column 7, line 11, "$1 \times 10^{-5}K^{-1}$." should read -- $1 \times 10^{-5}K^{-1}$. --

Column 7, line 12, "8. The process as claimed in claim 1 wherein the material" should read -- 8. The process as claimed in claim 1, wherein the material --

Column 7, line 16, "9. The process as claimed in claim 1 wherein the material" should read -- 9. The process as claimed in claim 1, wherein the material --

Column 7, line 20, "10. The process as claimed in claim 1 wherein the material" should read -- 10. The process as claimed in claim 1, wherein the material --

Signed and Sealed this

Thirtieth Day of January, 2007

JON W. DUDAS
*Director of the United States Patent and Trademark Office*